United States Patent
Hung et al.

(10) Patent No.: US 10,491,852 B1
(45) Date of Patent: Nov. 26, 2019

(54) SYSTEM AND METHOD FOR ACTIVATING WIDGET BASED ON SOUND VOLUME ADJUSTMENT

(71) Applicant: GOOD WAY TECHNOLOGY CO., LTD., New Taipei (TW)

(72) Inventors: I Hung, New Taipei (TW); Chang-Der Liu, New Taipei (TW); Yen-Ho Chen, New Taipei (TW)

(73) Assignee: GOOD WAY TECHNOLOGY CO., LTD., New Taipei (TW)

( * ) Notice: Subject to any disclaimer, the term of this patent is extended or adjusted under 35 U.S.C. 154(b) by 0 days.

(21) Appl. No.: 16/247,364

(22) Filed: Jan. 14, 2019

(51) Int. Cl.
*H04N 5/445* (2011.01)
*H04N 5/60* (2006.01)
*H04N 5/44* (2011.01)

(52) U.S. Cl.
CPC ....... *H04N 5/4403* (2013.01); *H04N 5/44582* (2013.01); *H04N 5/60* (2013.01); *H04N 2005/4412* (2013.01); *H04N 2005/4433* (2013.01)

(58) Field of Classification Search
CPC .. H04N 5/44543; H04N 5/445; H04N 5/4401; H04N 21/43615; H04N 5/4403; H04N 5/44582; H04N 5/60; H04N 2005/4412; H04N 2005/4433
USPC ............... 348/563, 564, 734, 738, 725, 569; 725/37, 151, 153, 139, 141, 100, 131, 725/133, 85
See application file for complete search history.

(56) References Cited

U.S. PATENT DOCUMENTS

| | | | | |
|---|---|---|---|---|
| 2008/0198275 | A1* | 8/2008 | Kinouchi | G11B 19/022 348/738 |
| 2012/0026408 | A1* | 2/2012 | Lee | H04N 5/4403 348/734 |

FOREIGN PATENT DOCUMENTS

| | | |
|---|---|---|
| CN | 104661099 A | 5/2015 |
| TW | M325674 | 1/2008 |

* cited by examiner

*Primary Examiner* — Sherrie Hsia
(74) *Attorney, Agent, or Firm* — Li & Cai Intellectual Property (USA) Office

(57) ABSTRACT

A system and a method for activating a widget based on sound volume adjustment are provided. The system includes a remote controller, an electronic device and a display device. When a trigger button is pressed, the remote controller outputs a first sound volume adjusting signal to be transmitted to the display device through the electronic device to control the display device to adjust a sound volume of an original video signal to output a first sound source signal, and may output a reminder signal. When the trigger button is pressed again, the remote controller outputs a second sound volume adjusting signal for controlling a sound volume of the display device to adjust the first sound source signal to output a second sound source signal, the electronic device activates the widget and controls the display device to display an operation interface of the widget.

14 Claims, 6 Drawing Sheets

000# SYSTEM AND METHOD FOR ACTIVATING WIDGET BASED ON SOUND VOLUME ADJUSTMENT

FIELD OF THE DISCLOSURE

The present disclosure relates to a system and a method for performing a hotkey function, and more particularly to a system and a method for activating widget based on sound volume adjustment.

BACKGROUND OF THE DISCLOSURE

With the development of intelligent technologies, a set-top box and other electronic devices having similar or identical functions continuously have been innovated and improved. This also complicates entertainment such as watching television. In addition, applications of digital television platforms are continuously expanded and are integrated with such as Internet, multimedia playback, interactive entertainment and so on. This results in higher demands on functions of the remote controller. In addition to basic operations such as channel selection, video/audio output, volume adjustment and other parameter settings, the use of smart terminals may involve more functions such as web browsing, text input, and games, making the commands transmitted by the remote controller more complicated. With an intelligent television, since the set-top box or other electronic devices provides more and more functions, the operation manners of the remote controller should be more simplified, such that a user can correctly operate the electronic product at initial use without having to read the instruction manual.

SUMMARY OF THE DISCLOSURE

In response to the above technical inadequacies, the present disclosure provides a system for activating widget based on sound volume adjustment, which includes a remote controller, an electronic device and a display device. The remote controller includes one or more trigger buttons and a trigger button detector circuit. The trigger button detector circuit is configured to detect the trigger buttons, and output a trigger button state signal when one of the trigger buttons is pressed. The electronic device includes a control circuit connected to the trigger button detector circuit. The control circuit is configured to count the number of times that the trigger button is pressed and output a first sound volume adjusting signal according to the trigger button state signal. The control circuit is configured to output a second sound volume adjusting signal when determining that the trigger button is pressed again during a preset time interval after a first time point. The display device includes a video input/output circuit and a display screen. The video input/output circuit is connected to the control circuit. The video input/output circuit is configured to output an original sound source signal. The video input/output circuit is configured to adjust an original sound volume of the original sound source signal according to the first sound volume adjusting signal to output a first sound source signal having a first sound volume that is the original sound volume where a first adjusted sound volume is increased in or decreased from at the first time point. The video input/output circuit is configured to adjust the first sound volume of the first sound source signal according to the second sound volume adjusting signal to output a second sound source signal having a second sound volume that is the first sound volume where a second adjusted sound volume is increased in or decreased from. The display screen is connected to the video input/output circuit. The display screen is configured to display an original sound volume display bar corresponding to the original sound volume when the original sound source signal is outputted. The display screen is configured to display a first sound volume display bar corresponding to the first sound volume according to the first sound source signal. The display screen is configured to display a second sound volume display bar corresponding to the second sound volume according to the second sound source signal. When the control circuit determines that the first sound source signal having the first adjusted sound volume and the second sound source signal having the second adjusted sound volume are outputted sequentially, the control circuit activates one or more external systems received from one or more external electronic devices, and outputs an activating signal for controlling the display screen to display an operation interface of the external system, wherein operational states of the one or more external electronic devices are displayed and controlled by using the operation interface.

In addition, the present disclosure provides a method for activating widget based on sound volume adjustment, including the following steps: (a) detecting whether a trigger button is pressed or not by a trigger button detector circuit of a remote controller; if the trigger button is not pressed, performing step (a); if the trigger button is pressed, outputting a trigger button state signal from the trigger button detector circuit and then performing next step (b); (b) counting the number of times that the trigger button is pressed to output a first sound volume adjusting signal according to trigger button state signal by a control circuit of an electronic device; (c) adjusting an original sound volume of an original sound source signal according to the first sound volume adjusting signal to output a first sound source signal having a first sound volume that is the original sound volume where a first adjusted sound volume is increased in or decreased from at a first time point by a video input/output circuit of a display device, and meanwhile, displaying a sound volume display bar corresponding to the first sound volume by a display screen of the display device; (d) detecting whether the trigger button is pressed or not by a trigger button detector circuit of a remote controller; if the trigger button is not pressed, performing step (a); if the trigger button is pressed, outputting a corresponding trigger button state signal from the trigger button detector circuit and then performing next step (e); (e) when the control circuit of the electronic device determines that the trigger button is pressed again during a preset time interval after the first time point according to the trigger button state signal, outputting a second sound volume adjusting signal by the control circuit; (f) adjusting the first sound volume of the first sound source signal according to the second sound volume adjusting signal to output a second sound source signal having a second sound volume that is the first sound volume where a second adjusted sound volume is increased in or decreased from by the video input/output circuit of the display device, and meanwhile, displaying a sound volume display bar corresponding to the second sound volume on the display screen of the display device; and (g) activating external systems received from one or more external electronic devices and outputting an activating signal for controlling the display screen to display operation interfaces of the external systems by the control circuit of the electronic device, and displaying and controlling operational states of the one or more external electronic devices by using the operation interface.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The present disclosure will become more fully understood from the following detailed description and accompanying drawings.

DETAILED DESCRIPTION OF THE EXEMPLARY EMBODIMENTS

Figure 1:
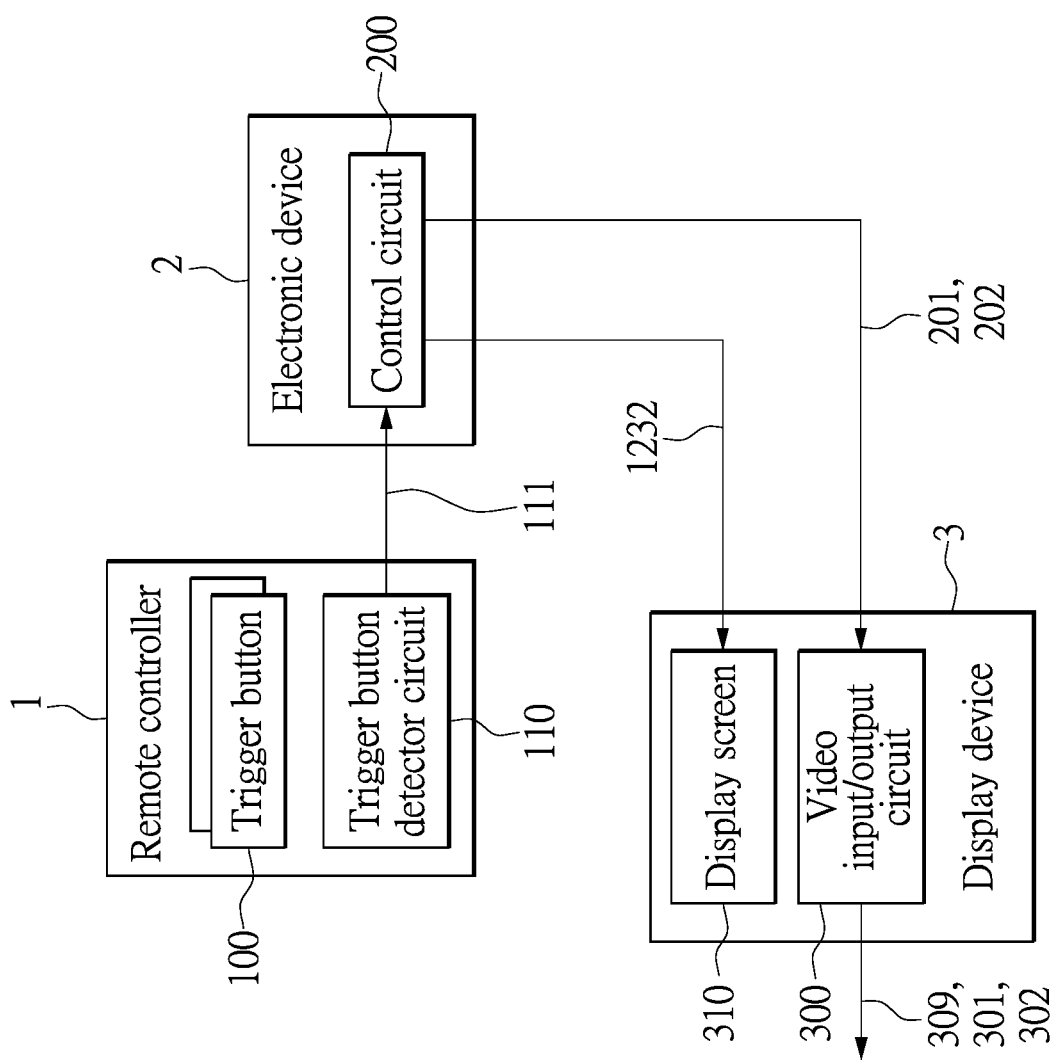
FIG. 1 is a block diagram of a system for activating a widget based on sound volume adjustment according to a first embodiment of the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

Reference is made to FIG. 1, which is a block diagram of a system for activating a widget based on sound volume adjustment according to a first embodiment of the present disclosure. As shown in FIG. 1, in the embodiment, the system for activating the widget based on sound volume adjustment includes a remote controller 1, an electronic device 2 and a display device 3. The electronic device 2 is connected the display device 3 to the remote controller 1. The remote controller 1 may include one or more trigger buttons.

In order to minimize the impact on visual perception of a user watching a video played by the display device 3, playback of the video should be modified. For example, the video should not stop playing, the video should not speed up or slow down, and characteristics such as screen brightness should not be changed. Therefore, in the embodiment, a sound volume button is used as a trigger button 100, which is configured to trigger activation of an external system such as the widget while playing the video. In practice, the sound volume button may be replaced with another trigger button 100 with different functions, such as a screen dim up button or a screen dim down button, which is used for triggering the activation of the external system.

The remote controller 1 may include a trigger button detector circuit 110, which is configured to continuously detect a pressed state of the trigger button 100 of the remote controller 1. When the trigger button 100 such as a sound volume up button or a volume down button is pressed, the trigger button detector circuit 110 may output a trigger button state signal 111. For example, the trigger button detector circuit 110 may be a piezoelectric sensor.

The electronic device 2 may include a control circuit 200 connected to the trigger button detector circuit 110. The control circuit 200 of the electronic device 2 may receive applications, signals, instructions or databases and so on for external systems such as the widget from external electronic devices. For example, the electronic device 2 may be a set-top box, or other electronic components that also have a function of controlling the operation of the display device 3 according to the operation of the remote controller 1. The electronic device 2 may have an operating system installed thereon.

Figure 4:
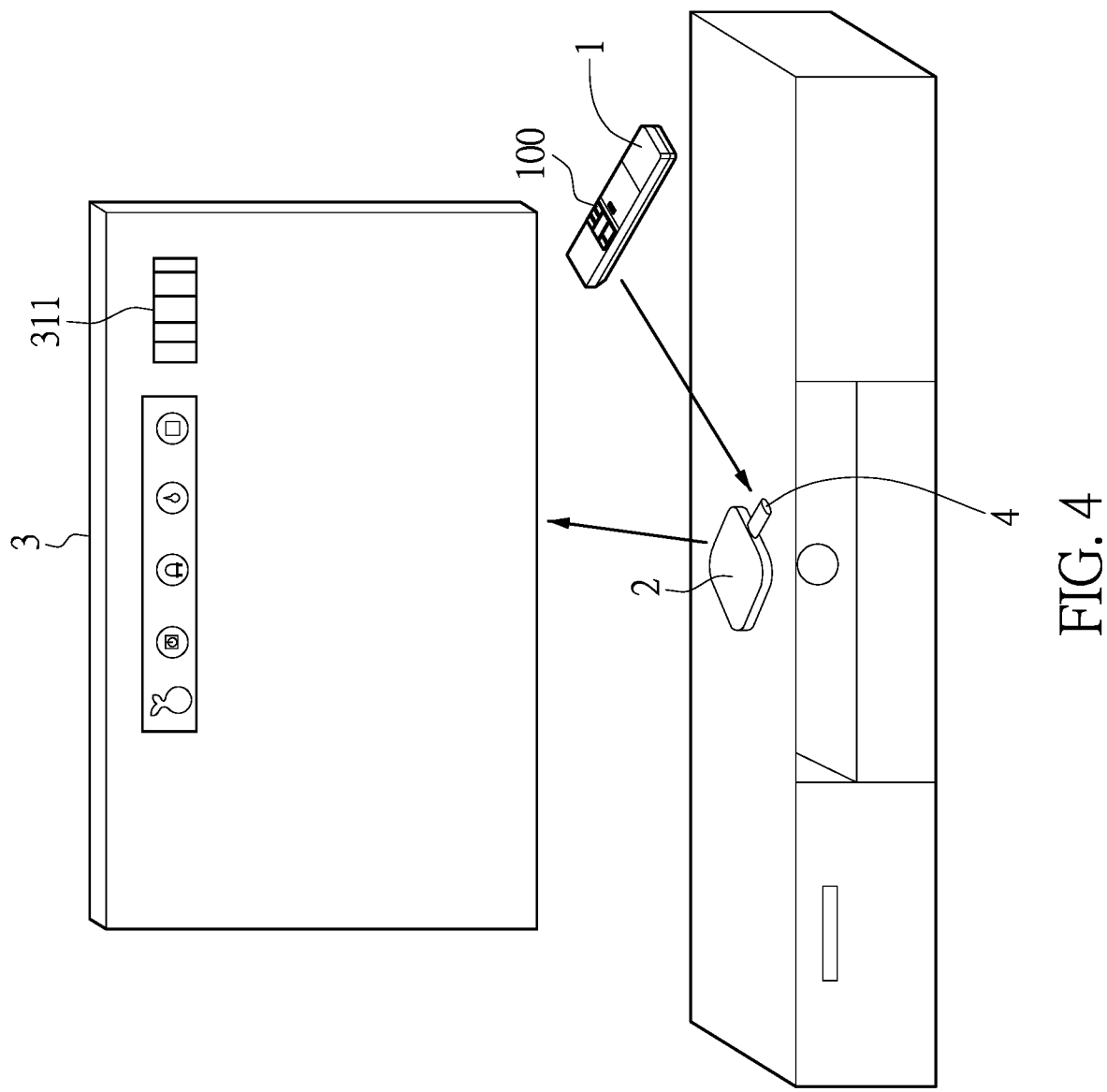
FIG. 4 is a schematic diagram of the system for activating the widget based on sound volume adjustment according to the second embodiment of the present disclosure.

When the electronic device 2 receives the trigger button state signal 111 from the remote controller 1, the control circuit 200 may determine which one of the trigger buttons 100 such as the sound volume up button or the down volume button is pressed, and count the number of times that the trigger button 100 is pressed, according to the trigger button state signal 111. The control circuit 200 then outputs a first sound volume adjusting signal 201 according to a pressed state of the trigger button 100 instructed by the trigger button state signal 111. The control circuit 200 may obtain a sound volume value represented by each of sound volume grids of a sound volume display bar 311 of the display device 3 as shown in FIG. 4. The control circuit 200 may determine how many sound volume grids in the sound volume display bar 311 are needed to be marked corresponding to the first adjusted sound volume of the first sound volume adjusting signal 201. Each of segments of the sound volume display bar 311 may be defined as each of the sound volume grids, but the sound volume display bar 311 is not limited to be specifically divided into the sound volume grids.

The display device 3 includes a video input/output circuit 300, which is connected to the control circuit 200 of the electronic device 2. The video input/output circuit 300 may be a speaker. The video input/output circuit 300 simultaneously plays the video and outputs an original sound source signal 309 matching the video. The video input/output circuit 300 adjusts an original sound volume of the original sound source signal 309 according to the first sound volume adjusting signal 201 to output a first sound source signal 301 having the original sound volume where a first adjusted sound volume is increased in or decreased from.

The display device 3 includes a display screen 310, which is connected to the control circuit 200 of the electronic device 2. The display device 3 may display the sound volume display bar 311 corresponding to the first sound source signal 301 on display screen 310 as shown in FIG. 4. A marked segment length and the number of the sound volume grids of the sound volume display bar 311 may depend on the original sound volume and the first adjusted sound volume.

When the trigger button 100 of the remote controller 1 is pressed, or the display device 3 is triggered to increase or reduce the sound volume thereof after the trigger button 100 is pressed, the control circuit 200 of the electronic device 2 may output a reminder signal 1232 to the display device 3 to instruct the display device 3 to display a reminder message corresponding to the reminder signal 1232 on the display screen 310 thereof. The reminder message may include a message for reminding that the trigger button 100 needs to be pressed again. It should be understood that, the reminder operation may be omitted.

When the trigger button 100 of the remote controller 1 is pressed again, the control circuit 200 determines a second adjusted sound volume and the number/length of second adjusted sound volume grids corresponding to the second adjusted sound volume to output a second sound volume adjusting signal 202, according to the trigger button state signal 111 indicating that the trigger button 100 is pressed again.

The video input/output circuit 300 of the display device 3 adjusts the first sound volume of the first sound source signal 301 according to the second sound volume adjusting signal 202 to output a second sound source signal 302 having a second sound volume that is the first sound volume where a second adjusted sound volume is increased in or decreased from. Accordingly, the second sound volume of the second sound source signal 302 depends on the first sound volume and the second adjusted sound volume. The display device 3 displays the sound volume display bar 311 corresponding to the second sound source signal 302 on the display screen 310. The lengths of the marked segments of the sound volume display bar 311 and the number of the marked sound volume grids of the sound volume display bar 311 depend on the second sound volume.

When the control circuit 200 determines that the video input/output circuit 300 of the display device 3 sequentially outputs the first sound source signal 301 having the first adjusted sound volume and the second sound source signal 302 having the second adjusted sound volume, and/or the display device 3 sequentially displays the sound volume display bars 311 which correspond to the first and second adjusted sound volumes respectively, the control circuit 200 activates the external systems received from the external electronic devices to control one or more external devices, and outputs an activating signal for controlling the display device 3 to display operation interfaces of the external systems on the display screen 310.

As described above, in the embodiment, when the trigger button 100 of the remote controller 1 is pressed twice, the sound volume of the display device 3 is adjusted twice, so as to trigger the operations of the external systems such as the widget. In practice, volume adjustments can be conducted for more or less times, which may be set as a condition for activating the external systems according to actual requirement.

Figure 2A:
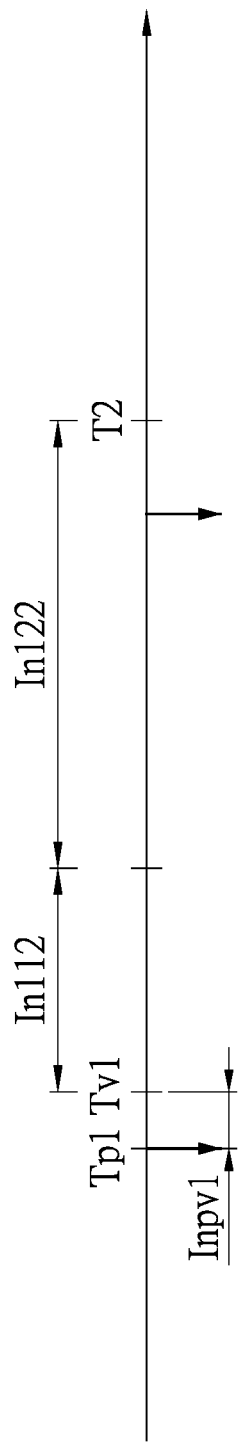
FIGS. 2a to 2c are schematic diagrams of manners of pressing a remote controller of the system for activating the widget based on sound volume adjustment according to the first embodiment of the present disclosure.
Figure 2B:
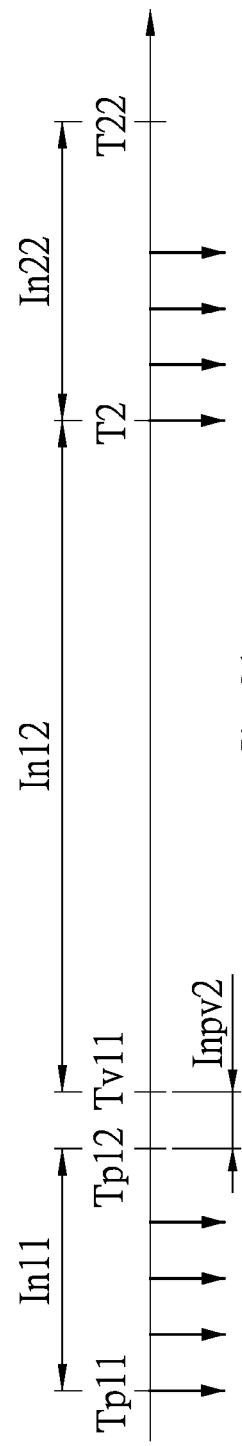
Figure 2C:
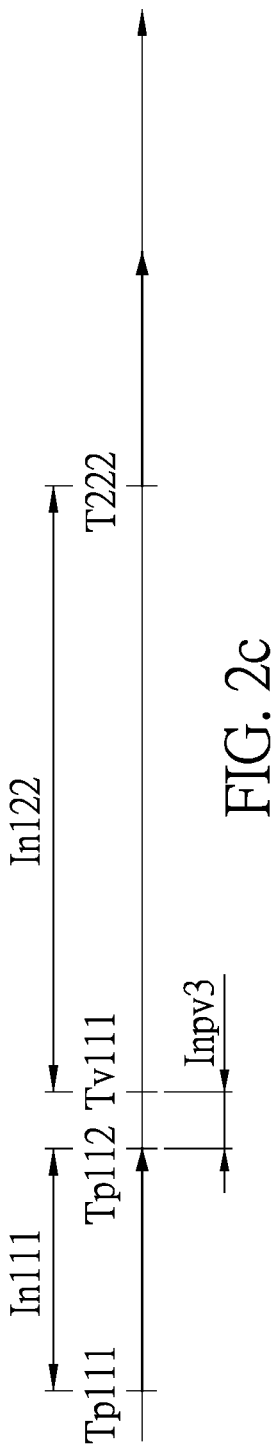

Reference is made to FIGS. 2a to 2c, which are schematic diagrams of manners of pressing a remote controller of the system for activating the widget based on sound volume adjustment according to the first embodiment of the present disclosure.

As shown in FIG. 2a, the trigger button 100 is pressed only one time for a short period of time during one time interval. When such a press is performed twice during two time intervals respectively, the control circuit 200 of the electronic device 2 is triggered to activate the received/mounted external systems to control the external devices. At a time point Tp1, the trigger button 100 of the remote controller 1 is pressed for the first time, as an arrow marked in FIG. 2a. That is, the trigger button 100 is pressed for a short period of time.

When the trigger button detector circuit 110 detects that the trigger button 100 is pressed again during a time interval Inpv1 after the time point Tp1 at which the remote controller 1 is pressed for the first time, the trigger button detector circuit 100 outputs the trigger button state signal 111 to the video input/output circuit 300. Then, the video input/output circuit 300 adjusts the original sound volume of the original sound source signal 309 by increasing or decreasing the first adjusted sound volume, according to the trigger button state signal 111. Then, the video input/output circuit 300 outputs the first sound source signal 301 having the first sound volume at a time point Tv1, wherein the first sound volume depends on the original sound volume and the first adjusted sound volume.

After the sound volume of the display device 3 is adjusted at the time point Tv1, if the trigger button 100 is pressed again during a time interval In122 after a waiting time interval In112, the display device 3 is triggered to generate the second adjusted sound volume, and the external system is activated based on the second adjusted sound volume. In practice, the waiting time interval In112 may be omitted. It should be understood that the trigger button 100 is pressed twice, each of which is for a short time. In this case, the sound volume of the display device 3 is slightly adjusted.

As shown in FIG. 2b, the trigger button 100 is pressed multiple times, each of which for a short period of time, during one time interval, such that the control circuit 200 of the electronic device 2 is triggered to activate the received/mounted external systems to control the external devices. The trigger button 100 of the remote controller 1 is pressed for the first time at a time point Tp11. Then, the trigger button 100 may be pressed multiple times at other time points after the time point Tp11, during a first preset time interval In11.

Then, the control circuit 200 counts the number of times that the trigger button 100 of the remote controller 1 is pressed, and determines the first adjusted sound volume of the display device 3 based on the time length and the number of times that the trigger button 100 is pressed to output the corresponding first sound volume adjusting signal 201 to the video input/output circuit 300, during a time interval Inpv2, according to the trigger button state signals 111. At a time point Tv11, the video input/output circuit 300 of the display device 3 outputs the first sound source signal 301 in response to the first sound volume adjusting signal 201.

After adjusting the sound volume of the display device 3 for the first time at the time point Tv11, the trigger button 100 is pressed multiple times such as twice, during a preset time interval In22 between a time point T2 and a time point T22 after waiting a time interval In12. The control circuit 200 may determine the adjusted sound volume of the display device 3 based on the time length and the number of times that the trigger button 100 is pressed.

In comparison with the adjusted sound volume in the pressing manner as shown in FIG. 2a, the sound volume can be greatly adjusted each time while activating the external system in the pressing manner as shown in FIG. 2b. The number of times that the trigger button 100 is pressed during the first preset time interval In11 is the same as or different from that during the preset time interval In22.

As shown in FIG. 2c, the trigger button 100 is pressed only one time for a long period of time during one time interval. When such a press is performed twice during two time intervals respectively, the control circuit 200 is triggered to activate the received/mounted external systems to control the external devices. The trigger button 100 is started to be pressed at a time point Tp111 and the press is maintained for a time interval In111. As a result, the display device 3 has the larger first adjusted sound volume due to the long pressing time. Then, the control circuit 200 counts the number of times that the trigger button 100 of the remote controller 1 is pressed, and determines the second adjusted sound volume of the display device 3 based on the time length and the number of times that the trigger button 100 is pressed, to output the corresponding second sound volume adjusting signal 202 to the video input/output circuit 300, during a time interval Inpv3 after a time point Tp112, according to the trigger button state signals 111. At a time point Tv111, the video input/output circuit 300 outputs the second sound source signal 302 in response to the second sound volume adjusting signal 202. The control circuit 200 starts timing when the display device 3 outputs the second sound source signal 302, that is, from the time point Tv111 at which the sound volume of the display device 3 is adjusted. After a preset time interval In122, the trigger button 100 is pressed again for a long period of time such that the external systems are triggered to control the external devices.

The time lengths of the above time intervals Inpv1, In112, In11, Inpv2, In12, In22, In111, Inpv3, and In122 and the pressing manners of the trigger button 100 may be set according to actual operations, the above descriptions are merely illustrative examples, and the present disclosure is not limited thereto.

The display screen 310 of the display device 3 displays the sound volume display bar 311, and at the same time, the video input/output circuit 300 of the display device 3 outputs the sound source signal 301 or 302. Alternatively, when the trigger button 100 is pressed for the first time, the display screen 310 of the display device 3 displays the sound volume display bar 311 thereon for a period of time. Then, when the trigger button 100 is pressed again during the time period, the sound volume of the video input/output circuit 300 and the length of the marked segments/the number of the marked sound volume grids of the sound volume display bar 311 are adjusted according to the first adjusted sound volume. As shown in FIG. 2b, when the trigger button 100 is pressed for the first time at the time point Tp11, the display device 3 displays the sound volume display bar 311 on the display screen 310, but the sound volume of the display device 3 is not adjusted. The time interval In11 is a time period during which the sound volume display bar 311 is displayed. The pressing of the trigger button 100, for example, pressing thrice, at other time points after the time point Tp11 during the time interval In11 is as a trigger condition for adjusting the sound volume.

As described above, the sound volume of the display device 3 is adjusted such that the trigger button 100 of the remote controller 1 is triggered to activate the operations of the external systems, as long as the trigger button 100 is pressed twice, regardless of whether the amplitudes of the adjusted sound volume being adjusted multiple times are the same or whether the sound volumes before and after the adjustment are the same.

For example, when the control circuit 200 of the electronic device 2 determines that the first adjusted sound volume is different from the second adjusted sound volume, the control circuit 200 activates the external systems and controls the display device 3 to display the operation interfaces of the external systems. The operational states of the external systems may be displayed or controlled by using the operation interfaces. When the control circuit 200 determines that the first adjusted sound volume is the same as the second adjusted sound volume, the control circuit 20 does not activate the external systems.

As another example, when the control circuit 200 determines that the first adjusted sound volume is different from the second adjusted sound volume, the control circuit 200 activates the external systems and controls the display device 3 to display the operation interfaces. On the contrary, when the control circuit 200 determines that the first adjusted sound volume is the same as the second adjusted sound volume, the control circuit 200 then determines whether the original sound volume of the original sound source signal 309 is the same as the second sound volume of the second sound source signal 302. If the original sound volume is different from the second sound volume, the control circuit 200 activates the external systems and controls the display device 3 to display the operation interfaces of the external systems. On the contrary, if the original sound volume and the second sound volume are the same, the external system is not activated.

If the last adjusted volume, namely, the second volume, is the same as the original volume, the operations of the external systems are not performed. In practice, the comparison between the first adjusted sound volume and the second adjusted sound volume may be omitted, and only the original sound volume and the second sound volume are compared.

Figure 3:
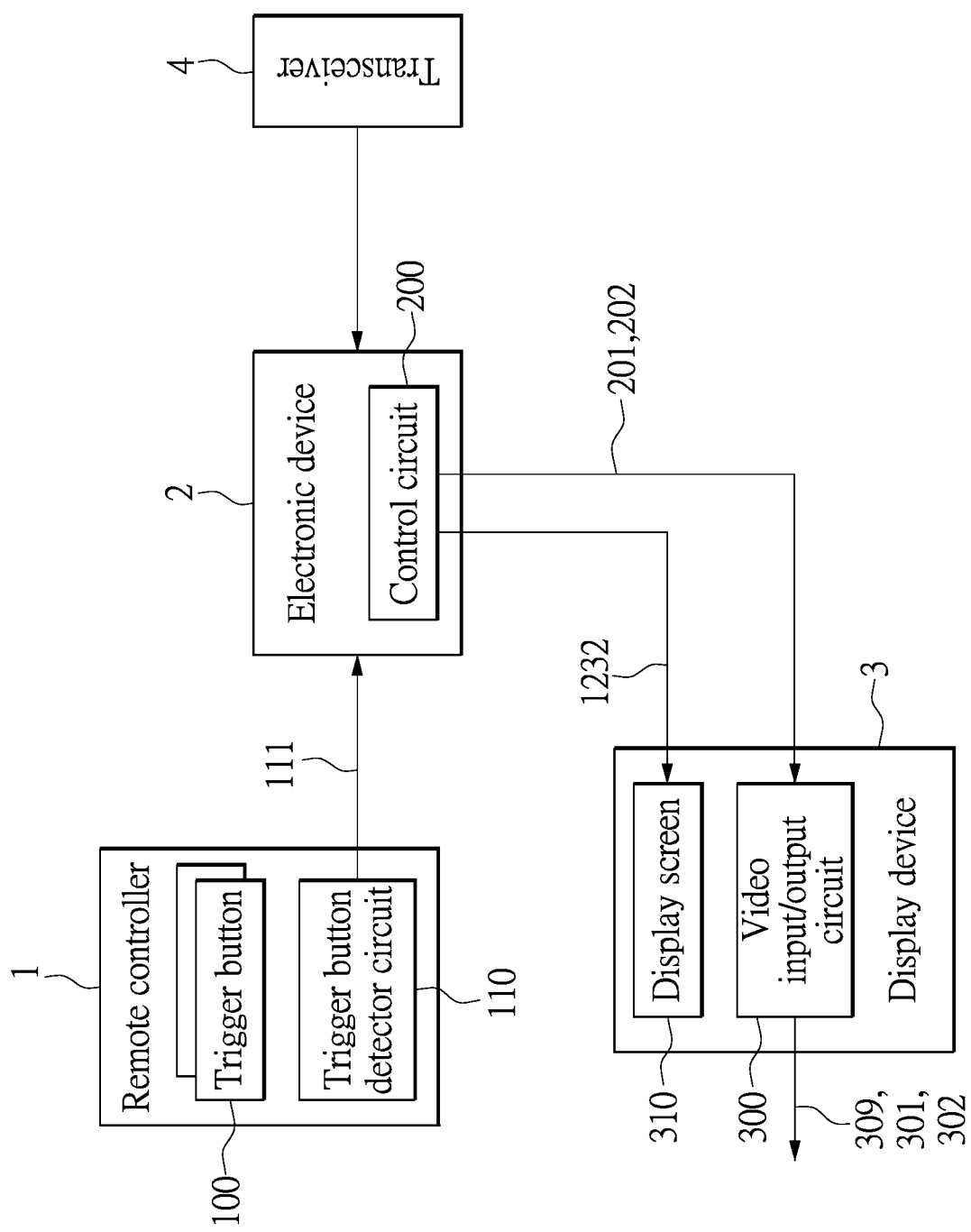
FIG. 3 is a block diagram of a system for activating a widget based on sound volume adjustment according to a second embodiment of the present disclosure.

Reference is made to FIGS. 3 and 4, which are a block diagram and a schematic diagram of a system for activating a widget based on sound volume adjustment according to a second embodiment of the present disclosure. The difference between the system of the first embodiment as shown in FIGS. 1 and 2 and the system of the second embodiment as shown in FIGS. 3 and 4 is that, the system of the second embodiment further includes a transceiver 4, aside from the remote controller 1, the electronic device 2 and the display device 3. The transceiver 4 may be a smart digital control stick or a digital TV dongle. The transceiver 4 may be inserted into a port of the electronic device 2. The transceiver 4 may be configured to receive applications, signals, instructions or databases of the external systems such as the widget from the external electronic devices, and transmit them to the electronic device 2.

Figure 5:
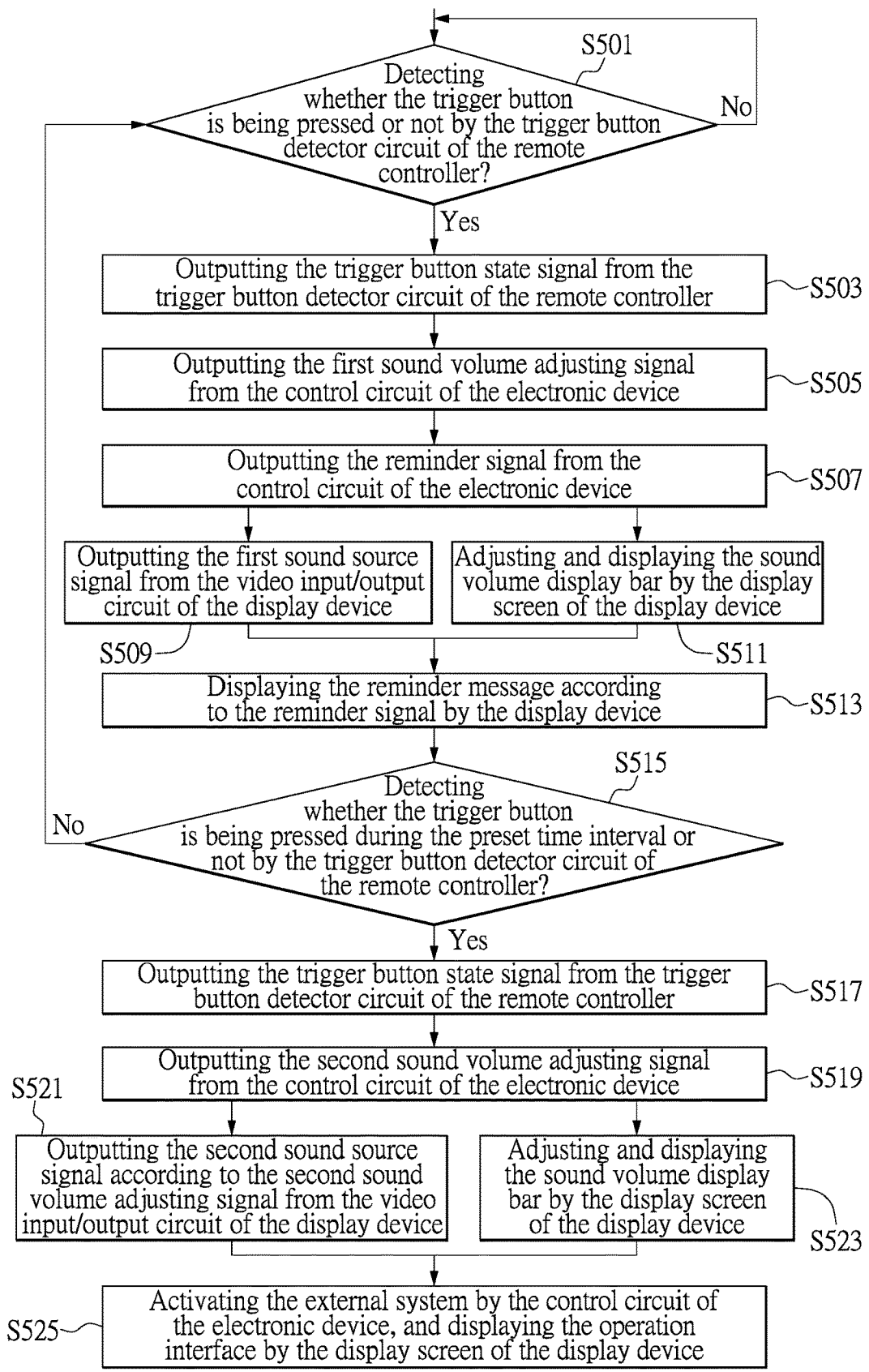
FIG. 5 is a flowchart of a method for activating a widget based on sound volume adjustment according to a third embodiment of the present disclosure.

Reference is made to FIG. 5, which is a flowchart of a method for activating a widget based on sound volume adjustment according to a third embodiment of the present disclosure. As shown in FIG. 5, the method for activating the widget based on sound volume adjustment includes the following steps S501 to S525 for the above system.

In step S501, the trigger button detector circuit of the remote controller detects whether the trigger buttons such as the sound volume down button and the sound volume up button are pressed or not. If all of the trigger buttons are not pressed, step S501 is continuously performed. If one of the trigger buttons is pressed, the trigger button detector circuit outputs the trigger button state signal in step S503, and then next step S505 is performed.

In step S505, the control circuit of the electronic device determines which one of the trigger buttons such as the sound volume down button or the sound volume up button is pressed, and counts the number of times that the trigger button is pressed, according to the trigger button state signal indicating a time point at which the trigger button is pressed. The control circuit of the electronic device outputs the first sound volume adjusting signal according to the pressed state indicated by the trigger button state signal.

In step S507, the control circuit of the electronic device outputs the reminder signal. In practice, steps S507 and S505 may be performed simultaneously.

In step S509, the video input/output circuit of the display device adjusts the original sound volume of the original sound source signal according to the first sound volume adjusting signal to output the first sound source signal at the first time point. In step S511, the display device displays the sound volume display bar corresponding to the first sound volume of the first sound source signal on the display screen. Steps S509 and step S511 may be performed simultaneously.

In step S513, the display device displays the reminder message for reminding that the trigger button needs to be pressed again according to the reminder signal on the display screen.

In step S515, the trigger button detector circuit of the remote controller detects whether the trigger button is pressed during the preset time interval after the first time point. If all of the trigger buttons are not pressed, step S501 is performed. If one of the trigger buttons is pressed, the trigger button detector circuit of the remote controller outputs the trigger button state signal in step S517.

In step S519, when the control circuit of the electronic device determines that the trigger button is pressed again during the present time interval after the first time point according to the trigger button state signal, the control circuit outputs the second sound volume adjusting signal according to the pressed state of the trigger button.

In step S521, the video input/output circuit of the display device adjusts the first sound volume of the first sound source signal according to the second sound volume adjusting signal to output the corresponding second sound source signal. In step S523, the display device displays the sound volume display bar corresponding to the second sound volume on the display screen. Steps S521 and step S525 may be performed simultaneously.

In step S525, the control circuit of the electronic device activates the external systems such as the widget, which are received from the external electronic devices. The control circuit of the electronic device outputs the activating signal for controlling the display device to display the operation interfaces of the external systems on the display screen. The external electronic devices are controlled or displayed via the operation interfaces.

In addition, for step S509 or S523 of the sound volume adjustment, the method for activating the widget based on sound volume adjustment may further include the following steps. When the control circuit of the electronic device determines that the pressed trigger button is a sound volume down button, the control circuit outputs the first sound source signal having the original sound volume where the first adjusted sound volume is decreased from, or the control circuit outputs the second sound source signal having the first sound volume where the second adjusted sound volume is decreased from. In addition, when the control circuit of the electronic device determines that the pressed trigger button is a sound volume up button, the control circuit outputs the first sound source signal having the original sound volume in which the first adjusted sound volume is increased, or the control circuit outputs the second sound source signal having the first sound volume in which the second adjusted sound volume is increased.

It should be understood that the steps described in the embodiments may be adjusted according to actual requirements. For example, an execution sequence of the steps can be changed, one or more steps such as steps S507 and S513 can be omitted, or the specific steps can be repeatedly performed.

Figure 6:
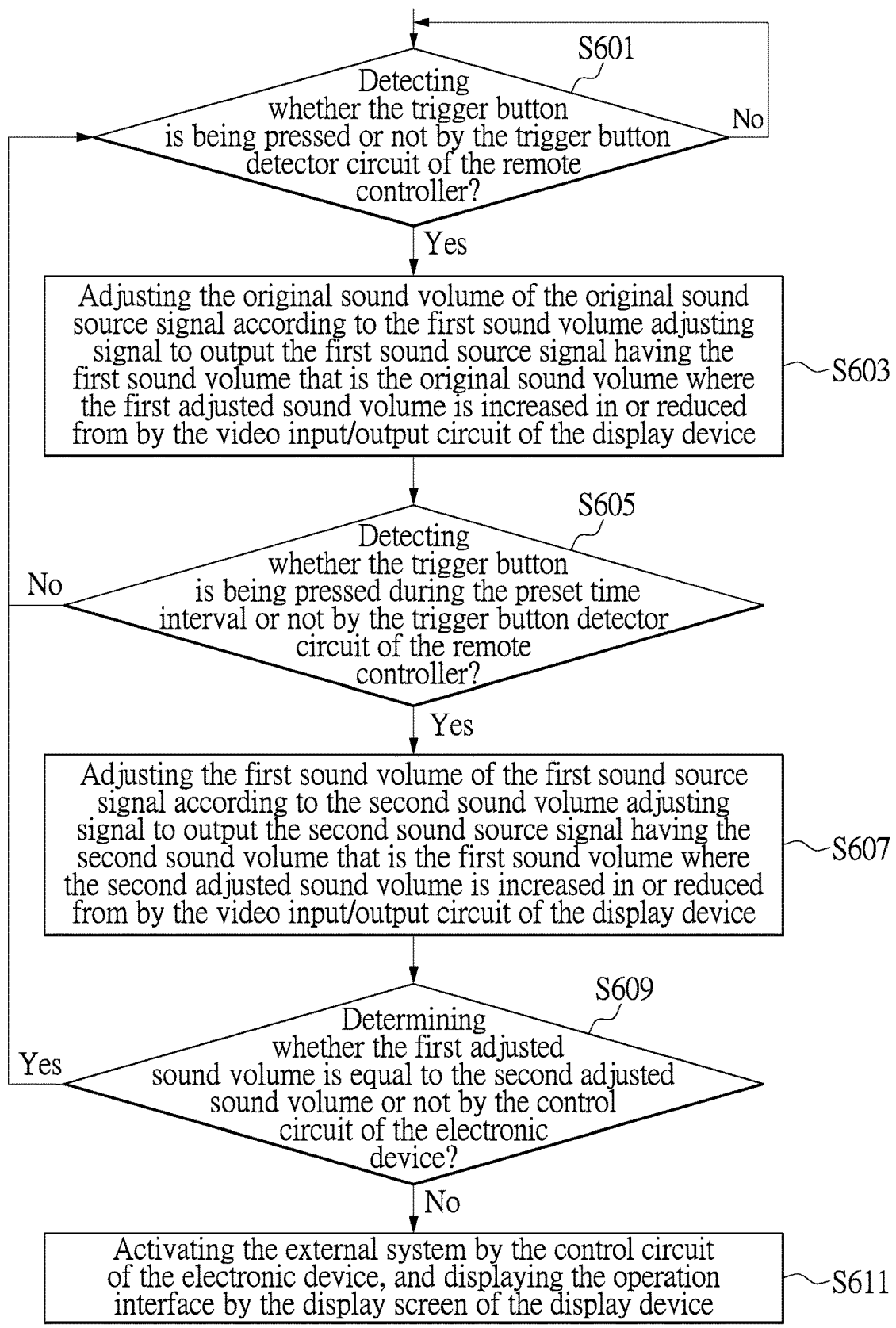
FIG. 6 is a flowchart of a method for activating a widget based on sound volume adjustment according to a fourth embodiment of the present disclosure.

Reference is made to FIG. 6, which is a flowchart of a method for activating a widget based on sound volume adjustment according to a fourth embodiment of the present disclosure. As shown in FIG. 6, the method for activating the widget based on sound volume adjustment includes the following steps S601 to S611 for the above system.

In step S601, the trigger button detector circuit of the remote controller detects whether the trigger buttons such as the sound volume down button and the sound volume up button are pressed or not. If all of the trigger buttons are not pressed, step S601 is continuously performed. If one of the trigger buttons is pressed, next step S603 is performed.

In step S603, the video input/output circuit of the display device adjusts the original sound volume of the original sound source signal according to the first sound volume adjusting signal to output the first sound source signal.

In step S605, the trigger button detector circuit of the remote controller detects whether the trigger button is pressed during the preset time interval after outputting the first sound source signal. If the trigger button is not pressed during the preset time interval, step S601 is performed. If the trigger button is pressed during the preset time interval, next step S607 is performed.

In step S607, the video input/output circuit of the display device adjusts the first sound volume of the first sound source signal according to the second sound volume adjusting signal to output the second sound source signal.

In step S609, the control circuit of the electronic device determines whether the first adjusted sound volume is same as the second adjusted sound volume. If the first adjusted sound volume is the same as the second adjusted sound volume, step S601 is performed. If the first adjusted sound volume is different from the second adjusted sound volume, step S611 is performed.

In step S611, the control circuit of the electronic device activates the one or more external systems received from the one or more external electronic devices. The control circuit outputs the activating signal for controlling the display device to display the operation interfaces of the external systems on the display screen. The external electronic devices are controlled or displayed via the operation interfaces.

In summary, the preset disclosure provides the system and the method for activating the widget based on sound volume adjustment, in which the sound volume buttons or other trigger buttons each having a function of adjusting the sound volume of the display device are set to be pressed so as to trigger the activation of the external system. In detail, the sound volume of the display device is adjusted by pressing the trigger button of the remote controller so as to trigger the external system received by the set-top box to display or control the operations of the external devices, under the condition of minimizing impact on the visual perception of the user.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A system for activating widget based on sound volume adjustment, comprising:
    a remote controller, including:
        one or more trigger buttons;
        a trigger button detector circuit configured to detect the trigger buttons, and output a trigger button state signal when one of the trigger buttons is pressed;
    an electronic device, including;
        a control circuit connected to the trigger button detector circuit, configured to count the number of times that the trigger button is pressed and output a first sound volume adjusting signal according to the trigger button state signal, and configured to output a second sound volume adjusting signal when determining that the trigger button is pressed again during a preset time interval after a first time point; and
    a display device, including:
        a video input/output circuit connected to the control circuit, configured to output an original sound source signal, configured to adjust an original sound volume of the original sound source signal according to the first sound volume adjusting signal to output a first sound source signal having a first sound volume that is the original sound volume where a first adjusted sound volume is increased in or decreased from at the first time point, and configured to adjust the first sound volume of the first sound source signal according to the second sound volume adjusting signal to output a second sound source signal having a second sound volume that is the first sound volume where a second adjusted sound volume is increased in or decreased from;
        a display screen connected to the video input/output circuit, configured to display an original sound volume display bar corresponding to the original sound volume when the original sound source signal is outputted, configured to display a first sound volume display bar corresponding to the first sound volume according to the first sound source signal, and configured to display a second sound volume display bar corresponding to the second sound volume according to the second sound source signal;
    when the control circuit determines that the first sound source signal having the first adjusted sound volume and the second sound source signal having the second adjusted sound volume are outputted sequentially, the control circuit activates one or more external systems received from one or more external electronic devices, and outputs an activating signal for controlling the display screen to display an operation interface of the external system, wherein operational states of the one or more external electronic devices are displayed and controlled by using the operation interface.

2. The system of claim 1, wherein the trigger buttons includes a sound volume down button and a sound volume up button.

3. The system of claim 1, wherein the electronic device further includes a transceiver, which is connected to the control circuit of the electronic device and the external electronic devices, and configured to receive the external systems from the external electronic devices and transmit the external systems to the control circuit of the electronic device.

4. The system of claim 1, wherein the control circuit counts the number of times that the trigger button is pressed and calculates a time length each time the trigger button is pressed during a first time interval, to determine the first adjusted sound volume, according to the trigger button state signal, and the control circuit counts the number of times that the trigger button is pressed and calculates a time length each time the trigger button is pressed during a second time interval, to determine the second adjusted sound volume, according to the trigger button state signal;
    wherein the first time interval is a time interval in which the display screen displays the first sound volume display bar, and the second time interval is a time interval in which the display screen displays the second sound volume display bar.

5. The system of claim 1, wherein when the control circuit determines that the first adjusted sound volume is different from the second adjusted sound volume, the control circuit activates the external system and controls the display screen to display the operation interface;
    when the control circuit determines that the first adjusted sound volume is the same as the second adjusted sound volume, the control circuit does not activate the external system and not output the activating signal.

6. The system of claim 1, wherein when the control circuit determines that the first adjusted sound volume is different from the second adjusted sound volume, the control circuit activates the external system and controls the display screen to display the operation interface;
    when the control circuit determines that the first adjusted sound volume is the same as the second adjusted sound volume, and then determines that the original sound volume is different from the second sound volume, the control circuit activates the external system and controls the display screen to display the operation interface;
    when the control circuit determines that the first adjusted sound volume is the same as the second adjusted sound volume, and then determines that the original sound volume is the same as the second sound volume, the control circuit does not activate the external system and not output the activating signal.

7. The system of claim 1, wherein when the control circuit outputs the first sound source signal at the first time point, the control circuit outputs a reminder signal, and the display screen displays a reminder message for reminding that the trigger button needs to be pressed again according to the reminder signal.

8. A method for activating widget based on sound volume adjustment, comprising the following steps:
  (a) detecting whether a trigger button is pressed or not by a trigger button detector circuit of a remote controller, and in response to the trigger button being not pressed, performing step (a), and in response to the trigger button being pressed, outputting a trigger button state signal from the trigger button detector circuit and then performing next step (b);
  (b) counting the number of times that the trigger button is pressed to output a first sound volume adjusting signal according to trigger button state signal by a control circuit of an electronic device;
  (c) adjusting an original sound volume of an original sound source signal according to the first sound volume adjusting signal to output a first sound source signal having a first sound volume that is the original sound volume where a first adjusted sound volume is increased in or decreased from at a first time point by a video input/output circuit of a display device, and meanwhile, displaying a sound volume display bar corresponding to the first sound volume by a display screen of the display device;
  (d) detecting whether the trigger button is pressed or not by a trigger button detector circuit of a remote controller, and in response to the trigger button not being pressed, performing step (a), and in response to the trigger button being pressed, outputting a corresponding trigger button state signal from the trigger button detector circuit and then performing next step (e);
  (e) when the control circuit of the electronic device determines that the trigger button is pressed again during a preset time interval after the first time point according to the trigger button state signal, outputting a second sound volume adjusting signal by the control circuit;
  (f) adjusting the first sound volume of the first sound source signal according to the second sound volume adjusting signal to output a second sound source signal having a second sound volume that is the first sound volume where a second adjusted sound volume is increased in or decreased from by the video input/output circuit of the display device, and meanwhile, displaying a sound volume display bar corresponding to the second sound volume on the display screen of the display device; and
  (g) activating external systems received from one or more external electronic devices and outputting an activating signal for controlling the display screen to display operation interfaces of the external systems by the control circuit of the electronic device, and displaying and controlling operational states of the one or more external electronic devices by using the operation interface.

9. The method of claim 8, further comprising steps of:
counting the number of times that the trigger button is pressed and calculating a time length each time the trigger button is pressed during a first time interval, to determine the first adjusted sound volume, according to the trigger button state signal, by the control circuit of the electronic device; and
counting the number of times that the trigger button is pressed and calculating a time length each time the trigger button is pressed during a second time interval, to determine the second adjusted sound volume, according to the trigger button state signal, by the control circuit of the electronic device;
wherein the first time interval is a time interval in which the display screen displays the first sound volume display bar, and the second time interval is a time interval in which the display screen displays the second sound volume display bar.

10. The method of claim 8, further comprising a step of:
receiving the external systems from the external electronic devices and transmitting the external systems to the electronic device by a transceiver.

11. The method of claim 8, further comprising steps of:
determining whether the first adjusted sound volume is the same as the second adjusted sound volume or not by the control circuit of the electric device, and in response to the first adjusted sound volume being not equal to the second adjusted sound volume, activating the external system and controlling the display screen to display the operation interface by the control circuit of the electronic device, and in response to the first adjusted sound volume being equal to the second adjusted sound volume, performing step (a).

12. The method of claim 8, further comprising steps of:
determining whether the first adjusted sound volume is the same as the second adjusted sound volume or not by the control circuit of the electric device, and in response to the first adjusted sound volume being not equal to the second adjusted sound volume, activating the external system and controlling the display screen to display the operation interface by the control circuit of the electronic device, and in response to the first adjusted sound volume being equal to the second adjusted sound volume, performing the next step; and
determining whether the original sound volume is the same as the second sound volume or not by the control circuit of the electric device; the original sound volume being not equal to the second sound volume, activating the external system and controlling the display screen to display the operation interface by the control circuit of the electronic device, and in response to the original sound volume being equal to the second sound volume, performing step (a).

13. The method of claim 8, further comprising steps of:
when the pressed trigger button is determined to be a sound volume down button, outputting the first sound source signal having the original sound volume where the first adjusted sound volume is decreased from, or outputting the second sound source signal having the first sound volume where the second adjusted sound volume is decreased from; and
when the pressed trigger button is determined to be a sound volume up button, outputting the first sound source signal having the original sound volume in which the first adjusted sound volume is increased, or outputting the second sound source signal having the first sound volume in which the second adjusted sound volume in increased.

14. The method of claim 8, further comprising steps of:
when the control circuit of the electronic device outputs the first sound source signal at the first time point according to the trigger button state signal, outputting a reminder signal from the control circuit; and
displaying a reminder message for reminding that the trigger button needs to be pressed again according to the reminder signal on the display screen of the display device.

* * * * *